United States Patent [19]

Bartsch

[11] 4,011,345

[45] Mar. 8, 1977

[54] EXPANDED SEMI-MOIST PET FOOD

[75] Inventor: Arthur G. Bartsch, Lake Zurich, Ill.

[73] Assignee: The Quaker Oats Company, Chicago, Ill.

[22] Filed: Nov. 26, 1975

[21] Appl. No.: 635,293

[52] U.S. Cl. .............................. 426/72; 426/250; 426/331; 426/332; 426/335; 426/532; 426/656; 426/657; 426/805
[51] Int. Cl.² .......................................... A23K 1/16
[58] Field of Search ............ 426/1, 2, 72, 331, 332, 426/655, 805, 623–625, 657, 250, 532

[56] References Cited

UNITED STATES PATENTS

| 3,447,920 | 6/1969 | Hale | 426/805 |
|---|---|---|---|
| 3,653,908 | 4/1972 | Buck | 426/646 |
| 3,745,021 | 7/1973 | Middlesworth | 426/805 |
| 3,908,025 | 9/1975 | Miller | 426/625 |

Primary Examiner—Jeanette M. Hunter
Attorney, Agent, or Firm—Mathew R. P. Perrone, Jr.

[57] ABSTRACT

An expanded semi-moist pet food which is sugarless and contains cereal grain to stabilize the expanded characteristics of the product.

15 Claims, No Drawings

EXPANDED SEMI-MOIST PET FOOD

BACKGROUND OF THE INVENTION

This invention relates to food and more particularly to an expanded, sugarless, semi-moist pet food.

Within the class of foods known as pet foods, there are three basic subdivisions—dry pet food, semi-moist pet food, and moist pet food. The moisture is determined by considering both the water present in the final product and the water combined with the various components that make up the final product. In general, the dry pet food — due to its low moisture content which is usually less than about 15 percent — tends to exhibit the greatest microbiological stability and requires no special handling or packaging upon distribution.

At the opposite end of the spectrum is the moist pet food having a moisture content in excess of about 50 percent. Due to the high moisture content of the moist pet food, microbiological stability is a major problem. This problem in a moist pet food is overcome only by heat sterilizing the moist pet food and packaging the moist pet food in a hermetically sealed container. Even with the heat sterilization and hermetically sealed package, refrigeration is required after the package of moist pet food is opened to preserve the leftover pet food for even a short time.

Semi-moist pet food has a moisture content generally ranging from about 15 to about 50 percent. Since semi-moist pet foods are higher in moisture content than dry and lower in moisture than canned, special techniques are required to render it microbiologically stable. This moisture content in combination with special techniques may produce a microbiologically stable food which does not require refrigeration. At the same time, the higher moisture content of the semi-moist pet food provides an increased palatability when compared to the dry pet food. The semi-moist pet food is generally rendered microbiologically stable by using high levels of sugar and solutes. In this fashion, shelf stability without refrigeration is achieved while providing a food having increased palatability relative to dry pet food.

When considering palatability the moist pet foods are the most palatable and the dry pet foods are least palatable. The semi-moist pet foods fall somewhere in between the moist and dry pet foods as to palatability. It follows, therefore, that the semi-moist products provide a higher palatability than dry and provide the convenience of being shelf stable over the canned.

To increase acceptability of a semi-moist pet food for both the pet owner, and the pet, it is desirable to have an expanded pet food for appearance sake and an adequately high moisture content for palatability purposes. However a maintained, relatively high, moisture content and expansion are not customarily compatible. In fact, it is usually required to sacrifice high moisture content for expansion or vice versa.

The expansion of a semi-moist pet food is difficult due to the high moisture content and prevalence of nonexpandable materials such as high levels of meat, sugar, and polyhydric alcohols. The high sugar content in conjunction with the higher moisture content of semi-moist pet food results in reduced expansion, clumping and piece distortion. On the other hand, the presence of sugar provides a great deal of the stability of a semi-moist pet food. The problem thus becomes one of achieving the expansion of the semi-moist pet food and stability of the semi-moist pet food while eliminating the heretofore necessary sugar used to provide stability under semi-moist conditions. In other words, the sugar necessary for stability has an adverse effect on the desired property of expansion. Thus, it has proven difficult to obtain the desired expansion while achieving the desired semi-moist stability.

It is known to achieve microbiological stability in a semi-moist pet food by using high levels of sugar and solutes above about 25 percent by weight of the semi-moist food, and antimycotic, and pH of around 6 to 8. It is also known to use low pH levels of a range of two to five in combination with the thermal pasteurization and hermetically sealed container to achieve a stable packaged product. However, rupture of the hermetically sealed container for a low pH pet food leads to mold and other microbiological defects, which factors indicate this food is not a true shelf stable semi-moist food. Accordingly, it has proven difficult to achieve the desired semi-moist stability and avoid microbiological degradation without the use of the above-referenced stability systems.

A further problem with the use of acid, as a stabilizing ingredient is a resulting sour or acid taste. Such a sour or acid taste renders a pet food less palatable to the pet consuming it. The use of high levels polyhydric alcohols or other solutes in combination with a higher pH also can interfere with a pet's enjoyment of the food. There is a problem in adjusting the balance between the acid content and the polyhydric content and the other stabilizing components to achieve the suitable palatability and stability for the semi-moist pet food.

Thus for both dogs, cats, and other pets it is difficult to reduce solute levels below 20 percent (sugar and polyhydric alcohols for example) without sacrificing both palatability and stability. It is also difficult to provide both palatability and good appearance without sacrificing one for the other.

SUMMARY OF THE INVENTION

Therefore, it is an object of this invention to provide a semi-moist pet food having maintained palatability.

It is a further object of this invention to provide a semi-moist pet food having reduced solute levels.

It is a still further object of this invention to provide a sugarless semi-moist pet food which is microbiologically stable.

Yet a further object of this invention is to provide an improved extrudable semi-moist pet food.

Also an object of this invention is to provide a semi-moist pet food having good piece formation.

Another object of this invention is to provide a process for making a low solute, semi-moist pet food.

Yet another object of this invention is to provide an expanded semi-moist pet food.

Still another object of this invention is to provide a semi-moist pet food having a maintained moisture content.

These and other objects of this invention are met by providing a sugarless, expanded, semi-moist pet food, and process for making the pet food.

DESCRIPTION OF THE PREFERRED EMBODIMENTS

A semi-moist pet food is rendered expandable and sugarless by virtue of the proper adjustment of pH solute level moisture and antimycotic in conjunction with the inclusion of ingredients which will expand and maintain the expanded structure.

Generally, the sugarless, expandable semi-moist pet food of this invention is composed of a protein source, a cereal, a polyhydric component, an animal or vegetable fat, a food grade acid, and an antimycotic. Additionally, vitamins, minerals, colorings, and suitable flavorings may be added to formulate the appropriate expanded semi-moist pet food of this invention. Water may be inherent in the ingredients or added to maintain the desired moisture content.

While it is not desired to be bound by any particular theory, expansion is believed to be maintained by the combination of various types of cereal grains, flours, meals or starches in conjunction with oilseed proteinaceous material. These ingredients may also supply the desired protein content of the finished product. The addition of oilseed proteinaceous ingredients and cereal grain derivatives, at the expense of non-expandable materials such as sugar, also provide the desired, expanded, textural characteristics of the finished product.

The preferred cereal grain derivatives are wheat flour, corn flour, oat flour and mixtures thereof. However, successful products can be produced with other cereal grain derivatives. Typical other cereal grain derivatives include but are not limited to wheat bran, milo, barley, rice, wheat starch, corn germ, wheat germ, corn gluten, wheat gluten, vital wheat gluten, corn starch, waxy maize corn starch, other modified starches and mixtures thereof. These cereal grain derivatives may possibly provide some protein for the pet food even to the point of being the sole source of protein in the pet food. Other protein sources are also feasible. Usage levels of cereal derivatives are 5–75% with a preferred range of 15–50%.

The preferred oilseed protein source is soy flour. However, other oilseed proteins may be successfully utilized. Typical oilseed proteins include soy bean protein, rape seed, peanut, flax seed, cottonseed, and mixtures thereof. These particular oilseeds are suitable for use in the pet food either as full fat seed, a meal, a concentrate, an isolate, a flour, or mixtures thereof. Usage levels are 0–60% with a preferred range of 5–30%.

Although oilseed proteinaceous materials and cereal grain derivatives can be discretely utilized as protein sources, a specific amount of these materials in combination yields a highly acceptable textural strength for expansion. The usage level of oilseed proteins and cereal grain derivative combinations is 25–80% with a preferred range of 40–65%.

Animal protein such as meat, meat by-products, other animal protein sources and mixtures thereof may also be a source of protein for the pet food of this invention. By meat is meant the flesh of cattle, swine, sheep, goat, horses, whale and other mammals, poultry, and fish. By meat by-products is meant those things shown in the 1975 Association of American Feed Control Officials, Inc. under No. 9 Animal Products, Page 0.3 Page 70 which defines meat by-products as the non-rendered clean wholesome part other than meat derived from slaughtered animals. Meat by-products include, but are not limited to lungs, spleen, kidneys, brain, livers, blood, partially defatted low temperature fatty tissue and stomachs and intestines freed of their contents. If it bears the name descriptive of its kind, it must correspond thereto (proposal 1973, adopted 1974 – N.R.C. 5-00-395). Animal protein also includes such materials as animal liver meal, animal liver and glandular meal, extracted animal liver meal, whale meal, meat and bone meal, animal by-product meal, dried meat solubles, meat meal, fish meal, fish protein concentrate, poultry parts, poultry by-products, poultry by-product meal, blood meal, milk products and egg products. Generally speaking, any one of the above named meat, meat by-products or animal protein products may be used in the semi-moist pet food. Also mixtures of two or more of the meat, meat by-products or other animal protein sources may be used in the semi-moist pet food. Additionally, meat, meat by-products and other animal protein source mixtures are suitable for use in the pet food of this invention.

Use of the above-referenced meat, meat by-products, and other animal protein sources is desirable from a palatability standpoint. Usage levels of these ingredients range from 0 to about 30% on a dry basis. More preferably, the usage range is 5% to 20%. By "dry basis" is meant that the moisture of the meat, meat by-product or animal protein source is excluded when considering the weights thereof added to the pet food of this invention. Products with higher levels of these ingredients do not have the textural characteristics desired for this invention. In addition, the protein contribution of meat or meat by-products can be replaced by an equivalent amount of protein contributed by oilseed protein and/or cereal grains resulting in a "meatless" formulation, which has the required textural characteristics.

A polyhydric component is suitable for use in a semi-moist pet food to provide stabilization and plasticizing properties. Typical polyhydric components are the polyhydric alcohols listed in U.S. Pat. No. 3,759,714 — to Burkwall. Propylene glycol, 1,3 butanediol, and mixtures thereof are the preferred polyhydric components for this invention. Up to about 14% by weight polyhydric component is suitable for use in this invention. More preferably, about 3 to about 9% polyhydric component is used. Reference to propylene glycol herein also includes the other polyhydric components used either singly or in combination therewith.

Up to about 3% of a food-grade acidic compound such as an acid or a salt is also included in the semi-moist pet food for stability purposes. Typical food-grade acids include acetic, lactic, adipic, succinic, and inorganic acids such as phosphoric, sulfuric, hydrochloric acid or mixtures thereof. Furthermore, the food-grade acid salts may include monocalcium phosphate, monosodium phosphate, aluminum sulfate, aluminum ammonium sulfate, aluminum calcium sulfate, aluminum potassium sulfate, aluminum sodium sulfate and mixtures thereof. These acids and salts can effect the lowering of the pH to the desired –6 range for the semi-moist pet food. The more preferred pH range is 4.2 to 5.9. The most preferred pH range is 4.6 to 5.6. Of course if a weakly acidic compound is used, a higher level may be added to achieve the desired pH if necessary. Also suitable mixtures of at least one food-grade acid or food grade to 3%. More preferably, the range is 0.5% to 1.5%.

The effective balance between the polyhydric component and the acid component in this invention is highly critical. The stability of the pet food increases as the pH is lowered. Also, at a lower pH less of a polyhydric alcohol is required. As the pH approaches 6.0 or higher, substantially more polyhydric alcohol is required for stability. The use of too much propylene glycol and butanediol or too much acid has an unsuitable effect on the pet food. The acid provides an acid or sour taste to the food. The use of too much of a polyhydric component produces a bitter taste which is also unacceptable to the pet. Thus, it is critical to balance the advantages of both components. It has been found that a combination of 3% to 9% polyhydric component, a pH of 4 to 6, and an effective amount of antimycotic provide the highly stable product with excellent palatability.

Generally, the antimycotic is present in an amount up to 1% by weight. More preferably the antimycotic is used at about 0.01% to 0.5%. Potassium sorbate is the preferred antimycotic due to availability and effectiveness. Other suitable antimycotics include sorbic acid, the benzoates, the parabens, the propionates, the acetates or mixtures thereof.

Up to about 20% by weight of the semi-moist pet food can also be animal or vegetable fat in addition to the fat inherently in the components. Animal fat is preferred for flavor, palatability and nutritional consideration. More preferably 2% to 8% of the fat above and beyond any fat inherent in the ingredients is used in the semi-moist pet food. Typical examples of animal fat include fish oil, chicken fat, prime steam lard, tallow and choice white grease. Vegetable fats are derived from corn, soy, cottonseed, peanut, sunflower and other oil bearing vegetable seeds.

Other additives may be included in this pet food as needed. These other additives include flavoring, vitamins, minerals, coloring and mixtures thereof. These components are added for nutritional purposes and palatability. Suitable amounts are easily determined by a person having ordinary skill in the art. However up to about 5% of these ingredients are customarily used. Ingredients in this category are exemplified by sodium chloride, potassium chloride, and other edible salts.

The moisture content of the pet food of this invention ranges from about 15 to about 50%. The more preferred level of moisture is from about 20 to about 40%. The most preferred moisture level is 22% to 32%. By moisture is meant the free water present in the invention in combination with the water present in the various other components that make up the pet food. These moisture levels are critical because they closely relate to the stability of the pet food when using the antimycotic, polyhydric component, and acids.

After acceptable doughs are produced, the degree of expansion is determined by the processing temperature and finished product moisture. From an aesthetic standpoint it is desirable to obtain maximum expansion at a given moisture level. Temperatures for expansion are those commonly associated with expansion, that is above about 200° F. (93° C). At constant moisture levels expansion increases as the temperature rises above 200° F. until textural collapse is obtained. At this temperature the piece strength is lost due to over-expansion. Successful expansion with minimal distortion in the intermediate moisture range can be accomplished up to 260° F. (127° C), however, the preferred range is (99° C to 116° C) 210°–240° F. At these temperatures (200°–260° F) or (93° to 127° C) the degree of expansion of this invention ranges from 2.5–5.2 cubic inches per ounce (1.3–3.0 cm$^3$/g) with a desired range from 3.2–4.2 cubic inches per ounce (1.8–2.4 cm$^3$/g).

Having thus described the invention, the following examples are presented to more fully illustrate without unduly limiting the invention. In the examples and throughout the specification all parts and percentages are by weight unless otherwise specified.

Example I: A semi-moist pet food modified for expansion purposes using a fresh meat by-product is made of the following ingredients:

| Ingredient | Formula % |
|---|---|
| Soy Flour | 17.5 |
| Wheat Flour | 15.5 |
| Poultry By-Product Meal | 14.5 |
| Oat Flour | 13.5 |
| Pork Lungs | 10.0 |
| Propylene Glycol | 6.0 |
| Animal Fat | 3.6 |
| Phosphoric Acid | 1.75 |
| Salt (NaCl) | 1.10 |
| Vitamins & Minerals | 0.45 |
| Potassium Sorbate | 0.2 |
| Water and Coloring | 15.90 |
| Total | 100.00% |

The above ingredients are mixed to form a dough and extruded at a temperature in the range of 105° to 107° C. The product displays an expansion of 3.2–3.3 (1.8–1.9 cm$^3$/gm) cubic inches per ounce. Expansion of the initial formulation before modification by sugar removal (and other means) leads to a very sticky end product with non-distinct piece shape.

EXAMPLE II

Table 1 gives two typical examples of components in an expanded, sugarless pet food product using no fresh meat or meat by-products.

Table I

|  | A | B |
|---|---|---|
| Soy Flour or other oilseed protein | 19. % | 19. % |
| Wheat Flour | 14. | 14. |
| Oat Flour | 14. | 14. |
| Meat & Bone Meal | 14. | 14. |
| 1,3-Butanediol | — | 6. |
| Propylene Glycol | 6. | — |
| Animal Fat | 4. | 4. |
| Phosphoric Acid | 2. | 2. |
| Vitamins, Minerals, Coloring, Flavoring, etc. | 1.8 | 1.8 |
| Potassium Sorbate | 0.2 | 0.2 |
| Water | 25.0 | 25.0 |
| Total | 100.0% | 100.0% |

The dry ingredients are blended and the animal fat and liquid ingredients are added and mixed into a dough using a conventional paddle type mixer. The dough is transported to an extruder and heated to about 200°–260° F. As the product exits from the extruder, it passes through an appropriate shaped die, and some steam flashes off as the product expands. It is then cut into the desired length. The product is then cooled and packaged. The bulk displacement of the above products ranges from 2.5–5.2 cubic inches per ounce depending upon the temperature-moisture relationship.

An especially suitable die for use with this invention is a die having a generally triangular shape. This die having a generally triangular shape produces a product having the referenced degree of expansion. Other dies are suitable for use in the production of this pet food. However, these dies vary the degree of expansion for the pet food. So while the degree of expansion is given for a particular die, it is evident that other degrees of expansion for the pet food are suitable if the die is changed. For example, if a die were put on the extruder to form a circular piece of pet food having an aperture located substantially in the center thereof, the density would differ as compared to the cited densities, but the product would be substantially the same in appearance and palatability. In other words, the change of die changes the density and expansion rate but has no effect on the formation of an otherwise suitable product. The above-referenced triangular shape is generally an isoceles triangle or equilateral triangle having sides ranging from 0.30 inch to 0.45 inch (about 0.75 centimeter to 1.15 centimeter) or more preferably 0.35 inch to 0.40 inch (about 0.89 centimeter to 1.02 centimeter).

Having thus fully disclosed and described this new unique invention, what is claimed and sought to be secured by Letters Patent of the United States is as follows:

1. An expanded, semi-moist, sugarless pet food having a moisture content of 20 percent to 40 percent comprising:
   a. 0 percent to 30 percent animal protein source;
   b. 5 to 30 percent oilseed vegetable protein source;
   c. 15 percent to 50 percent of at least one cereal grain derivative — wherein (b), and (c) combine to comprise 40 percent to 65 percent;
   d. 3 percent to 9 percent of at least one polyhydric alcohol;
   e. 0 percent to 20 percent of at least one fat;
   f. up to about 3 percent of at least one edible food grade acid or acid salt sufficient to adjust the pH to 4.0 to 6.0;
   g. up to 5 percent of at least one additive selected from the group consisting of salt, vitamins, minerals, coloring and flavoring; and
   h. 0.01 percent to 0.5 percent of at least one antimycotic;
   i. all percentages being based on the weight of the pet food.

2. The pet food of claim 1 wherein the oilseed protein is soy flour.

3. The pet food of claim 1 wherein the moisture level is 22 percent to 32 percent.

4. The pet food of claim 1 wherein the animal protein source is at least one selected from the group consisting of a meat, and a meat by-product.

5. The pet food of claim 1 wherein the pH of the pet food is 4.2 to 5.9.

6. The pet food of claim 5 having a pH of 4.6 to 5.6.

7. The pet food of claim 6 having a moisture content of 22 percent to 32 percent.

8. The pet food of claim 6 wherein the degree of expansion is 1.3 to 3.0 cubic centimeters per gram.

9. The pet food of claim 8 wherein the degree of expansion is 1.8 to 2.4 cubic centimeters per gram.

10. The pet food of claim 9 wherein the cereal grain derivative is wheat flour, corn flour, oat flour, or mixtures thereof.

11. The pet food of claim 10 wherein the oilseed vegetable protein is soy flour.

12. The pet food of claim 10 wherein the oilseed vegetable protein is at least one selected from the group consisting of soy bean, rapeseed, flaxseed and cottonseed.

13. The pet food of claim 12 wherein the polyhydric component is propylene glycol; 1,3-butanediol; or mixtures thereof.

14. The pet food of claim 13 wherein the fat is 2 percent to 8 percent by weight.

15. The pet food of claim 14 wherein the animal protein source comprises 5 percent to 20 percent and is meat and bone meal.

* * * * *

UNITED STATES PATENT OFFICE
CERTIFICATE OF CORRECTION

PATENT NO. : 4,011,345
DATED : March 8, 1977
INVENTOR(S) : Arthur G. Bartsch

It is certified that error appears in the above-identified patent and that said Letters Patent are hereby corrected as shown below:

In Column 4, at Line 55 for "-6" please read --4-6--.

In Column 4, at Line 61, after "food grade", please read --acidic salt may be used. More preferably, the range is 0.5%--.

Signed and Sealed this fifth Day of July 1977

[SEAL]

Attest:

RUTH C. MASON
*Attesting Officer*

C. MARSHALL DANN
*Commissioner of Patents and Trademarks*